(12) United States Patent
Sharkey et al.

(10) Patent No.: US 10,664,351 B2
(45) Date of Patent: May 26, 2020

(54) AUTOMATED RECOVERY OF UNSTABLE MOBILE DEVICES

(71) Applicant: Google LLC, Mountain View, CA (US)

(72) Inventors: Jeffrey Sharkey, Boulder, CA (US); Svetoslav Ganov, San Francisco, CA (US)

(73) Assignee: Google LLC, Mountain View, CA (US)

( * ) Notice: Subject to any disclaimer, the term of this patent is extended or adjusted under 35 U.S.C. 154(b) by 231 days.

(21) Appl. No.: 15/839,845

(22) Filed: Dec. 12, 2017

(65) Prior Publication Data
US 2019/0179707 A1    Jun. 13, 2019

(51) Int. Cl.
*G06F 11/07* (2006.01)
*G06F 11/14* (2006.01)
(Continued)

(52) U.S. Cl.
CPC ............ *G06F 11/1441* (2013.01); *G06F 1/24* (2013.01); *G06F 9/4401* (2013.01);
(Continued)

(58) Field of Classification Search
CPC ...... G06F 11/1441; G06F 1/24; G06F 9/4401; G06F 21/57; G06F 2201/805; G06F 2201/82; G06F 2221/034; G06F 11/0742; G06F 11/0793; G06F 11/1433; G06F 11/1438
(Continued)

(56) References Cited

U.S. PATENT DOCUMENTS

| 5,708,776 A * | 1/1998 | Kikinis | G06F 11/1417 714/10 |
| 6,230,285 B1 * | 5/2001 | Sadowsky | G06F 11/1417 714/14 |

(Continued)

FOREIGN PATENT DOCUMENTS

WO    00/73930    12/2000

OTHER PUBLICATIONS

International Searching Authority, International Search Report and Written Opinion for PCT Pat. App. No. PCT/US2018/034209, dated Aug. 8, 2018.

(Continued)

*Primary Examiner* — Chae M Ko
(74) *Attorney, Agent, or Firm* — McDonnell Boehnen Hulbert & Berghoff LLP

(57) ABSTRACT

Apparatus and methods related to recovering a computing device are provided. A computing device can determine that the computing device has entered into a corrupted state after being initialized at least a pre-determined number of times during a pre-determined interval of time. The computing device can store at least system data and information about a plurality of changes to the system data. After determining that the computing device has entered into the corrupted state, the computing device can identify untrusted changes to the system data from the plurality of changes, wherein the untrusted changes are made by untrusted entities. The computing device can reset the untrusted changes to the system data to default values. After resetting the untrusted changes to the system data to default values, the computing device can be initialized.

20 Claims, 8 Drawing Sheets

(51) Int. Cl.
    *G06F 1/24*       (2006.01)
    *G06F 9/4401*     (2018.01)
    *G06F 21/57*      (2013.01)
(52) U.S. Cl.
    CPC ...... *G06F 11/0742* (2013.01); *G06F 11/0793* (2013.01); *G06F 11/1433* (2013.01); *G06F 21/57* (2013.01); *G06F 2201/805* (2013.01); *G06F 2201/82* (2013.01); *G06F 2221/034* (2013.01)
(58) Field of Classification Search
    USPC ...................................... 714/23, 19
    See application file for complete search history.

(56)            References Cited

U.S. PATENT DOCUMENTS 7,971,258  B1 *  6/2011  Liao ....................... G06F 21/564
                                                          713/164
    8,181,247  B1 *  5/2012  Pavlyushchik ....... G06F 21/552
                                                          726/22
    8,438,423  B1 *  5/2013  Barkelew .............. G06F 11/076
                                                          713/2
    8,819,330  B1     8/2014  Spangler et al.
    2005/0223239 A1 * 10/2005 Dotan ..................... G06F 21/52
                                                          713/188
    2012/0102568 A1 *  4/2012 Tarbotton .............. G06F 21/552
                                                          726/23
    2013/0047031 A1    2/2013 Tabone et al.
    2016/0294559 A1 * 10/2016 Dabak .................. H04L 9/3247
    2018/0006820 A1 *  1/2018 Arasu ..................... G06F 16/00
    2018/0013779 A1 *  1/2018 Aguayo Gonzalez .......................
                                                          H04L 63/06

OTHER PUBLICATIONS

Microsoft Corporation, "Description of the Windows Registry Checker Tool (Scanreg.exe)", May 3, 2017, available via the Internet at support.microsoft.com/en-us/help/183887/description-of-the-windows-registry-checker-tool-scanreg-exe (last visited Oct. 13, 2017).
Microsoft Corporation, "How to back up and restore the registry in Windows", May 12, 2017, available via the Internet at support.microsoft.com/en-us/help/322756/how-to-back-up-and-restore-the-registry-in-windows (last visited Oct. 13, 2017).
MiTeC, "MiTecHomepage", Feb. 21, 2010, available via the Internet at web.archive.org/web/20100221212206/www.mitec.cz/wrr.html (last visited Nov. 8, 2017).

* cited by examiner

Recovery Procedure
⬐ 102

120 Corrupted State Detection
- 210 Frequent initialization / crash loop test
  - Determine whether device initializes / boots more than A1 times in A2 minutes
- 220 Frequent application restart test
  - Determine whether one or more selected applications are restarted more than B1 times in B2 minutes
  - Example selected applications – telephone application, messaging application, video call application, camera application, settings application, browser application
- 230 Excessive battery drain test
  - Determine whether battery life is reduced more than C1% in C2 minutes
- 240 Incorrect system clock test
  - Determine whether system clock is more than D1 years off from reference correct time and/or last verified correct device time
- 250 Loss of communications test
  - Determine whether (a) short-range and/or long-range communications is/are not functioning properly and (b) communications hardware is functioning properly
- 260 Additional tests

FIG. 2

Recovery Procedure
↗ 102

310 Software/Data Corrective Actions

312 Clear all persistent data

314 Clear system change log of all (both trusted and untrusted) changes

316 Reset system values changed by all (trusted and untrusted) entities to default values 318 Clear system log of changes made by untrusted entities 320 Reset system values changed by untrusted entities to default values ←——— Escalation Level ———

350 System Log

| Name | Value | Default | Application | Trusted/ Untrusted Entity Status | Experimental Change |
|---|---|---|---|---|---|
| Setting1 | 1 | 0 | UserApp | Untrusted | N |
| Setting2 | 3 | 0 | FactoryApp | Trusted | N |
| Setting14 | A14 | A1 | ExperiApp | Untrusted | Y |
| ... | | | | | |

FIG. 3A

Recovery
Procedure
↙─102

310 Software/Data Corrective Actions

312 Clear all persistent data

314 Clear system change log of all (both trusted and untrusted) changes

316 Reset system values changed by all (trusted and untrusted) entities to default values 318 Clear system log of changes made by untrusted entities 320 Reset system values changed by untrusted entities to default values ← Escalation Level →

330 Hardware Corrective Actions

332 Hard Device Reset

334 Soft Device Reset

336 Reset one or more components (e.g., camera, communications transceiver)

338 Clear one or more regions of non-persistent memory (e.g., Wi-Fi stack, user memory)

340 Clear one or more hardware registers

| 350 System Log | | | | | |
|---|---|---|---|---|---|
| Name | Value | Default | Application | Trusted/ Untrusted Entity Status | Experimental Change |
| Setting1 | 1 | 0 | UserApp | Untrusted | N |
| Setting2 | 3 | 0 | FactoryApp | Trusted | N |
| Setting14 | A14 | A1 | ExperiApp | Untrusted | Y |
| ... | | | | | |

FIG. 3B

AUTOMATED RECOVERY OF UNSTABLE MOBILE DEVICES

BACKGROUND

Many computing devices, including mobile computing devices, can run application software to perform various functions, such as communication-related functions, data manipulation functions, image generation and/or presentation functions, audio generation and/or presentation function, and other functions. The application software can be downloaded, or communicated to a computing device from a server or other computing device. In some cases, the application software can be downloaded as part of a software package. The software package can include application software and instructions for installing the application software. For example, the software package can be executable to carry out the instructions to install the application software. Typically, a mobile computing device can be "booted" or initialized upon user request; e.g., after a user presses one or more keys or buttons on a keyboard, device, or touch screen; or upon user-directed power up of the mobile computing device.

SUMMARY

In one aspect, a method is provided. A computing device determines that the computing device has entered into a corrupted state after the computing device has been initialized at least a pre-determined number of times during a pre-determined interval of time. The computing device stores at least system data and information about a plurality of changes to the system data. After determining that the computing device has entered into the corrupted state, the computing device identifies one or more untrusted changes to the system data from the plurality of changes to the system data, where the one or more untrusted changes were made by one or more untrusted entities. The computing device resets the one or more untrusted changes to the system data to one or more default values. After resetting the one or more untrusted changes to the system data to the one or more default values, the computing device is initialized.

In another aspect, a computing device is provided. The computing device includes one or more processors; and data storage storing at least system data, information about a plurality of changes to the system data, and computer-executable instructions. The computer-executable instructions, when executed by the one or more processors, cause the computing device to perform functions. The functions include: determining whether the computing device has entered into a corrupted state after the computing device has been initialized at least a pre-determined number of times during a pre-determined interval of time; after determining that the computing device has entered into the corrupted state, identifying one or more untrusted changes to the system data from the plurality of changes to the system data, where the one or more untrusted changes were made by one or more untrusted entities; resetting the one or more untrusted changes to the system data to one or more default values; and after resetting the one or more untrusted changes to the system data to the one or more default values, initializing the computing device.

In another aspect, a non-transitory computer-readable medium is provided. The non-transitory computer-readable medium has stored thereon computer-executable instructions that, when executed by one or more processors of a computing device, cause the computing device to perform functions. The functions include: determining that the computing device has entered into a corrupted state after the computing device has been initialized at least a pre-determined number of times during a pre-determined interval of time, the computing device storing at least system data and information about a plurality of changes to the system data; after determining that the computing device has entered into the corrupted state, identifying one or more untrusted changes to the system data from the plurality of changes to the system data, where the one or more untrusted changes were made by one or more untrusted entities; resetting the one or more untrusted changes to the system data to one or more default values; and after resetting the one or more untrusted changes to the system data to the one or more default values, initializing the computing device.

In another aspect, a computing device is provided. The computing device includes: means for determining that the computing device has entered into a corrupted state after the computing device has been initialized at least a pre-determined number of times during a pre-determined interval of time, means for storing at least system data and information about a plurality of changes to the system data; means for identifying one or more untrusted changes to the system data from the plurality of changes to the system data after determining that the computing device has entered into the corrupted state, where the one or more untrusted changes were made by one or more untrusted entities; means for resetting the one or more untrusted changes to the system data to one or more default values; and means for initializing the computing device after resetting the one or more untrusted changes to the system data to the one or more default values.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 2 illustrates techniques for detecting a corrupted state of a computing device in the context of the recovery procedure of FIG. 1, in accordance with at least some example embodiments.

FIG. 3A illustrates software corrective actions and a system log, in accordance with at least some example embodiments.

FIG. 3B illustrates hardware and software corrective actions and a system log, in accordance with at least some example embodiments.

DETAILED DESCRIPTION

Figure 1:
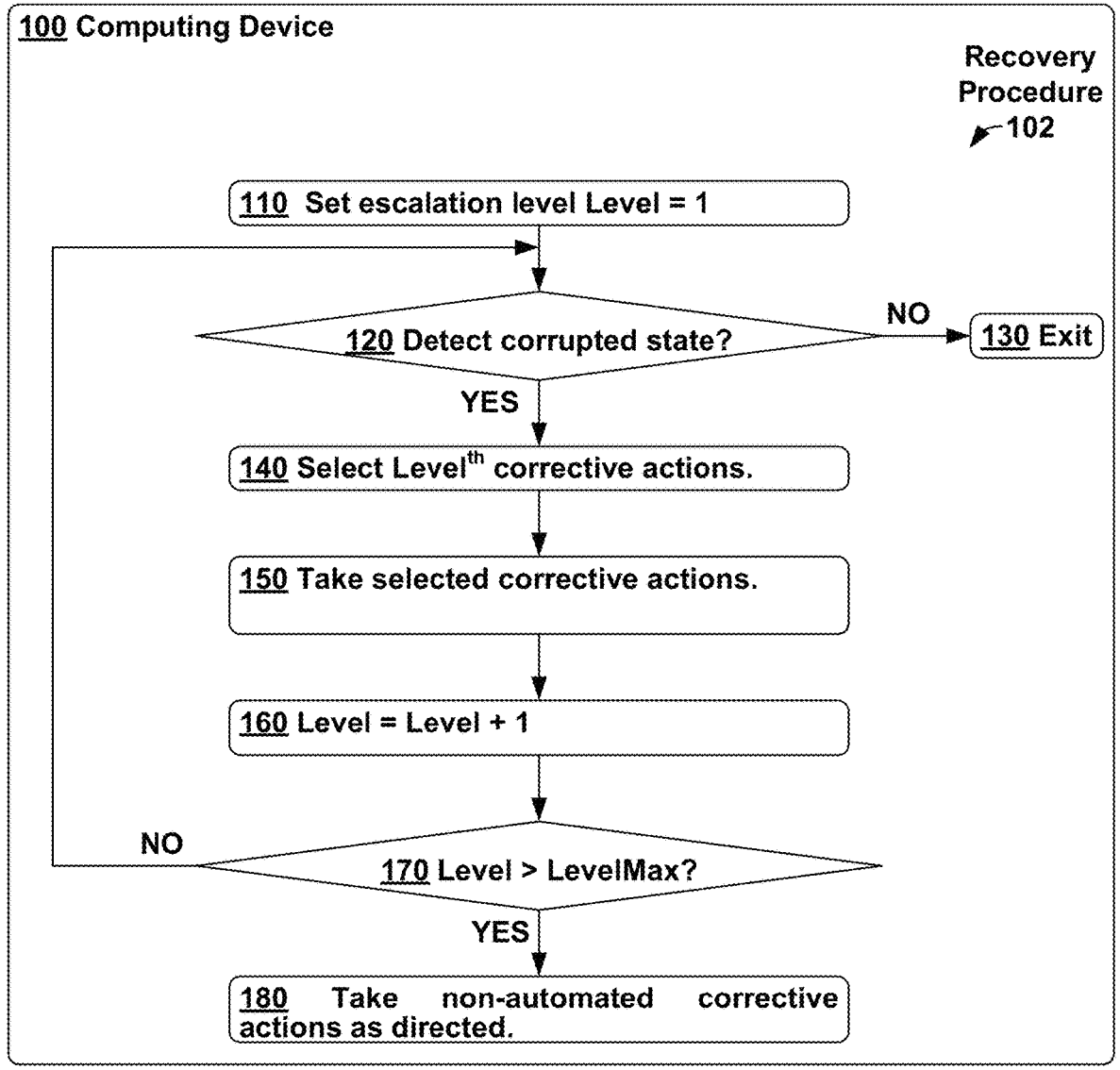
FIG. 1 shows a flowchart for a recovery procedure for a computing device, in accordance with at least some example embodiments.

Automated Recovery of Unstable and/or Corrupted Mobile Devices

A computing device, such as a smart phone, can enter into a corrupted state where the computing device and/or applications running on the computing device are frequently restarted, debilitating some or all of the functionality of the computing device. In some cases, an ordinary user of the computing device cannot recover the computing device from the corrupted state. For example, some devices require unusual key sequences to perform recovery techniques designed to recover the computing device from the corrupted state.

The herein-described functionality includes an enhanced recovery procedure to recover a computing device from a corrupted state with little or no user intervention. The recovery procedure can watch for a "crash loop" or other instability of the operating system and/or other software of the computing device. A crash loop or "boot loop" involves the computing device "crashing" or failing to operate and subsequently "booting" or initializing to recover from a failure to operate in a relatively short time; e.g., a crash loop can involve the computing device crashing and rebooting a pre-determined number of times (e.g., a value in the range 2-20) during a pre-determined amount of time (e.g., 30 seconds, 1 minute, 5 minutes, 1 hour). Other instability of the operating system and/or other software can involve one or more applications crashing and subsequently being reinitialized a pre-determined number of times (e.g., a value in the range of 2-20) during a pre-determined amount of time (e.g., 30 seconds, 1 minute, 5 minutes, 1 hour, 5 hours).

The numbers of times and amounts of time for crash loops and detecting instability can differ; e.g., a crash loop can be detected when the operating system of the computing device restarts more than 5 times in 5 minutes, or instability can be detected when a "persistent" application (e.g., a telephone dialer application, text messaging application, a browser application wireless communication application) is reinitialized more than 5 times in 30 seconds. In some examples, the recovery procedure can watch for other possible symptoms that the computing device has entered into a corrupted state; e.g., symptoms related to computing hardware, or unexpected/erroneous data stored in memory.

Once a crash loop or other instability in the computing device is detected, the recovery procedure of the computing device tries to recover the computing device from the corrupted state. For example, the recovery procedure can proceed through a series of escalating corrective actions involving software and/or hardware initializations to recover the computing device from the corrupted state. One set of escalating corrective actions can include:

1. As a first, and least severe, corrective action, the recovery procedure of the computing device can clear/remove any temporary or experimental data settings of system data that may have caused entry into the corrupted state. For example, a remote "experiment" or change of system data may have set system data related to screen brightness to an invalid value. Then, clearing the experimental change of (incorrect) screen-brightness-related system data may cause the computing device to recover from the corrupted state.

2. As a second, and more severe corrective action, the recovery procedure of the computing device can reset/restore any modified device settings of system data back to default values. The computing device can reset/restore settings of system data for "untrusted entities" that differ from "trusted entities". A trusted entity can be an entity that can be considered to make valid changes to system data items under all circumstances; e.g., an entity manufacturing a computing device, a customer support entity resolving a complaint with the computing device, etc. An untrusted entity can be any entity that is not a trusted entity; that is, an entity that can be considered to make at least some invalid changes to system data items; e.g., a user of the computing device, a customer support entity making experimental data changes, etc. In particular, the computing device can perform the second corrective action by: (a) resetting untrusted changes—e.g., experimental data changes and/or changes made by an untrusted entity—to default values; (b) removing all untrusted changes from a log or other record of system data changes; and (c) resetting changes to system data items made using trusted changes—e.g., changes that are made by a trusted entity and/or changes that are not untrusted changes—to default values. In some cases, the default values are stored in the log/other record of system data changes. In other cases, the default values are "factory" values, where the factory values are set by a manufacturer or other trusted entity, that may or may not be stored as part of the log/other record of system data changes; e.g., computing device 100 can store factory values of system data items in a file or other record that is separate from the above-mentioned log. For example, the recovery procedure of the computing device can remove all system data related to paired Bluetooth devices. If a reason for entering the corrupted state involves corrupted Bluetooth data or other non-default system data, the computing device may recover from the corrupted state.

3. As a third, and more severe corrective action, the recovery procedure of the computing device can reboot the computing device, perhaps after removing some or all (user) data stored in non-persistent memory and/or persistent memory. In some cases, the third corrective action involves also performing the second corrective action of restoring system data to factory defaults.

Each of these steps increases in severity. After taking each recovery action, the computing device can wait to determine whether the device has exited the corrupted state (e.g., wait to determine whether the device initializes normally). The recovery procedure can "escalate" or proceed to a more severe corrective action if the computing device has not exited/remains in the corrupted state. Other examples of escalating corrective actions are possible as well.

Some recovery actions can involve clearing and/or resetting changes made to data items of the system data mentioned above based on an entity making one or more changes to one or more system data items. As mentioned above, the second recovery procedure mentioned above distinguishes between trusted and untrusted entities. As another example, the first of the three recovery procedures mentioned above can involve determining whether an entity making temporary or experimental data settings of system data is a trusted entity or an untrusted entity. In other examples, a system data change can be classified as being associated with a trusted entity or with an untrusted entity based on an application used to make the system data change. As a particular example, suppose a computing device has three applications: "FactoryApp" that can only make changes to system data that stay within manufacturer's guidelines for proper device behavior, "UserApp" that can make some limited changes to system data that deviate from manufacturer's guidelines for proper device behavior, and "ExperiApp" that can make experimental and other changes to system data that deviate from manufacturer's guidelines for proper device behavior. In this example, changes to system data made by the FactoryApp can be considered to be made by a trusted entity, since the changes to system data cannot deviate from the manufacturer's guidelines, while changes to system data made by the UserApp and the ExperiApp can be considered to be made by an untrusted entity, since at least some changes to system data can deviate from the manufacturer's guidelines.

As an example, during the first of the three recovery procedure mentioned above, changes to system data items made by trusted entities can be retained, but changes made to system data items made by untrusted entities can be reset. Also during the first recovery procedure, a log of changes to system data items made by all entities can retain entries of changes made by untrusted entities. Then, during the second recovery procedure, all changes to system data items can be reset, and logged changes to system data items made by untrusted entities can be discarded. Then, during the third recovery procedure, all logged changes to system data items can be discarded. Other examples are possible as well. Recovery procedures that distinguish changes to system data items based on trusted and untrusted entities allows for device recovery in some instances without having to reset intended user changes (e.g., device settings made using a trusted application.)

The herein-described automated recovery procedures that self-restore computing devices from corrupted states can reduce customer support calls related to recovering devices from corrupted states to device-related entities, such as mobile carriers and device OEMs. Reducing such calls can reduce costs and time to the device-related entities and users of computing devices alike spent on customer support calls recovering devices from corrupted states. Further, the herein-described recovery procedures can work in a "standalone" mode; that is, a mode where the computing device is disconnected from other (computing) devices. A standalone recovery procedure has the advantage of working in remote places and/or in emergency situations where the user may not have (enough) network coverage, or USB cables to perform network-driven and/or other external-device driven recovery procedures. As another example, the herein-described automated recovery procedures can be used to recover computing devices that have updated remotely and where the update may put a computing device into a corrupted state. Then, the herein-described automated recovery procedures that recover from corrupted states caused by updates can reduce support and maintenance costs; e.g., reduce time and costs on customer support calls for corrupt or failed updates.

FIG. 1 shows a flowchart for a recovery procedure 102 for computing device 100, in accordance with at least some example embodiments. Recovery procedure 102 can begin at block 110, where computing device 100 can set an escalation level variable Level equal to a value of 1.

At block 120, computing device 100 can determine whether computing device 100 is in a corrupted state. If computing device 100 determines that computing device 100 is in the corrupted state, computing device 100 can proceed to block 140. Otherwise, computing device 100 determines that computing device 100 is not in the corrupted state; and can proceed to block 130. For example, computing device 100 can use one or more of techniques 210, 220, 230, 240, 250, 260 discussed below to determine whether computing device 100 is in the corrupted state.

FIG. 2 illustrates techniques for detecting a corrupted state of a computing device, for example, techniques that can be used during block 120 of recovery procedure 102 for computing device 100, in accordance with at least some example embodiments. For example, during block 120 of recovery procedure 102, computing device 100 can use one or more of techniques 210, 220, 230, 240, 250, and 260 to detect whether computing device 100 is in a corrupted state.

Technique 210 can involve performing a frequent initialization and/or crash loop test. The frequent initialization and/or crash loop test can involve determining whether the device initializes and/or boots at least A1 times in A2 minutes. For example, A1 can be an integer value selected from the range [1, 100] and A2 can be a value selected from the range [0, 120]. As a more specific example, if A1=5, and A2=5, then the frequent initialization and/or crash loop test can involve determining whether computing device 100 initializes/boots at least 5 times in 5 minutes. If the frequent initialization and/or crash loop test succeeds; that is, if computing device 100 initializes and/or boots more than A1 times in A2 minutes, then computing device 100 can determine that computing device 100 is in the corrupted state.

Technique 220 can involve performing a frequent application restart test. The frequent application restart test can involve determining whether one or more selected applications are restarted at least B1 times in B2 minutes. Example selected applications include, but are not limited to: a runtime application used by an operating system, a telephone application, a messaging application, a video call application, a camera application, a settings application, and a browser application.

For example, B1 can be an integer value selected from the range [1, 100] and B2 can be a value selected from the range [0, 120]. As a more specific example, if B1=5, and B2=0.5, then the frequent application restart test can involve determining whether computing device 100 restarts one or more selected applications at least 5 times in 0.5 minutes (=30 seconds). In some examples, the frequent application restart test can be performed on a per-selected application basis; e.g. a test of whether computing device 100 restarts selected application S1 at least B1 times in B2 minutes is independent of a test of whether computing device 100 restarts selected application S2 at least B1 times in B2 minutes. In other examples, the frequent application restart test can be performed for all selected applications; e.g., a test of whether computing device 100 restarts all of selected applications {S1 . . . S2} at least B1 times in B2 minutes.

If the frequent application restart test succeeds; that is, if computing device 100 restarts one or more selected applications at least B1 times in B2 minutes, then computing device 100 can determine that computing device 100 is in the corrupted state.

In embodiments where computing device 100 has a battery, technique 230 can be performed, which involves performing an excessive battery drain test. The excessive battery drain test can involve determining whether a "battery life"; i.e., an amount of time computing device 100 could execute using battery power solely before recharging the battery, of computing device 100 is reduced at least C1% in C2 minutes. For example, C1 can be a value selected from the range [0.01, 99.99] and B2 can be a value selected from the range [0, 20]. As a more specific example, if C1=5, and C2=1, then the frequent application restart test can involve determining whether computing device 100 uses at least 5% of its battery life in one minute. If the excessive battery drain test succeeds; that is, if battery life of computing device 100 is reduced at least C1% in C2 minutes, then computing device 100 can determine that computing device 100 is in the corrupted state.

Technique 240 can involve performing an incorrect system clock test. The incorrect system clock test can involve determining whether a system clock of computing device 100 is more than D1 years off from reference correct time and/or last verified correct device time. For example, D1 can be a value that is greater than or equal to 1; e.g., the incorrect system clock test can involve determining whether if the system clock of computing device 100 is off by more than one year. If the incorrect system clock test succeeds; that is, if the system clock of computing device 100 is off by at least D1 years, then computing device 100 can determine that computing device 100 is in the corrupted state.

Technique 250 can involve performing a loss of communications test. The loss of communications test can involve determining whether (a) short-range (e.g., Wi-Fi™ Bluetooth™) and/or long-range (e.g., Wireless Wide Area Network (WWAN)) communications is not functioning properly and (b) the related communications hardware is functioning properly. For example, to determine whether short-range and/or long-range communications is not functioning, computing device 100 can repeatedly attempt to communicate using short-range and/or long-range communications to one or more devices. If these communication attempts repeatedly fail, then computing device 100 can determine that the related short-range and/or long-range communications is not functioning properly. Also, to determine whether communications hardware is functioning properly, computing device 100 can execute one or more diagnostics on the communications hardware that are intended to verify whether the communications hardware is functioning properly. If the a loss of communications test passes, that is, if short-range and/or long-range communications with computing device 100 is not functioning properly while communications hardware of computing device 100 is functioning properly, then computing device 100 can determine that computing device 100 is in the corrupted state.

Technique 260 can involve performing one or more additional tests for determining whether computing device 100 is in a corrupted state; e.g., one or more tests regarding access to and/or correctness of system-related data, such as communications-related data; e.g., data related to one or more Service Set Identifiers (SSIDs), data in system data structures; e.g., caches, buffers, and/or other data structures. used by an operating system of computing device 100. If any additional tests are available, then the additional test(s) can be executed. If the one or more executed additional tests indicate that computing device 100 is in a corrupted state, then computing device 100 can determine that computing device 100 is in the corrupted state.

To determine if computing device 100 is in a corrupted state, computing device 100 can carry out one or more of techniques 210, 220, 230, 240, 250, 260. Then, if any one of the carried-out techniques 210, 220, 230, 240, 250, 260 pass, computing device 100 can determine computing device 100 is in a corrupted state. As such, techniques 210, 220, 230, 240, 250, 260 enable self-determination without user input (that is, enable automatic determination) as to whether computing device 100 is in a corrupted state. In some examples, computing device 100 can include one or more application programming interfaces (APIs) that can enable addition and/or modification of techniques for determining a corrupted state (e.g., modification of one or more of techniques 210, 220, 230, 240, 250, 260; addition of one or more new techniques for determining computing device 100 is in a corrupted state; disabling use of one or more of techniques 210, 220, 230, 240, 250, 260).

At block 130 of FIG. 1, after computing device 100 has determined that computing device 100 is not in the corrupted state, computing device 100 can exit recovery procedure 102, thereby ending recovery procedure 102.

At block 140, computing device 100 can select corrective actions associated with the value of the Level variable discussed above in the context of block 110. The corrective actions can include corrective actions associated with hardware and/or corrective actions associated with software of computing device 100; e.g., software corrective actions 310 and/or hardware corrective actions 330 discussed immediately below. The corrective actions can be associated with an escalation level; for example, a corrective action associated with an escalation level of N can be intended to be more severe/affect more functionality of computing device 100 than a corrective action associated with an escalation level of N-1. In some examples, computing device 100 can include one or more APIs that can enable addition and/or modification of corrective actions (e.g., modification of one or more of software corrective actions 310 and/or one or more hardware corrective actions 330; addition of one or more software corrective actions 310 and/or hardware corrective actions 330; disabling use of one or more of software corrective actions 310 and/or one or more of hardware corrective actions 330).

FIG. 3A illustrates software corrective actions 310 along with system log 350, in accordance with at least some example embodiments. Software corrective actions 310 can include, but are not limited to (in decreasing order of severity/value of the Level variable): corrective action 312 of clearing all persistent data, corrective action 314 of clearing a system log (e.g., system log 350) of both untrusted and trusted changes, corrective action 316 of resetting system values changed by both untrusted and trusted entities, corrective action 318 of clearing the system log of untrusted changes, and corrective action 320 of resetting system values changed by untrusted entities to default values.

System log 350 can include one or more fields, including a "Name" field for a name of a changed system data item, a "Value" field for a value of the changed system data item, a "Default" field for a default value of the changed system data item, an "Application" field for a software program/application used to change the system data item, and a "Trusted/Untrusted Entity Status" field indicating whether an entity changing the system data item is trusted or untrusted, and an "Experimental Change" field indicating whether the change in the system data is associated with an experiment or change in system data performed to determine if the change leads to enhanced performance of computing device 100. In some examples, the Application field can indicate whether the entity is trusted or untrusted; i.e., use of a trusted (or untrusted) application implies that a change to a system data item is made by a trusted (or untrusted) entity. In other examples, system log 350 can be implemented without the Default field. In still other examples, the Default field can store a previous value of the system data item instead of a default value. In even other examples, more, less, and/or different fields of data can be stored in system log 350.

For example, system log 350 shows three entries: a first entry for a system data item named "Setting1" with a default value of "0" recording a change to a value of "1" made using an application named "UserApp" by an "Untrusted" entity and indicated as not being part of an experiment by an Experimental Change field value of "N"; a second entry for a system data item named "Setting2" with a default value of "0" recording a change to a value of "3" made using an application named "FactoryApp" by a "Trusted" entity and indicated as not being part of an experiment by an Experimental Change field value of "N"; and a third entry for a system data item named "Setting14" with a default value of "A1" recording a change to a value of "A14" made using an application named "ExperiApp" by an "Untrusted" entity and indicated as being part of an experiment by an Experimental Change field value of "Y".

In other examples, the Application field can provide information indicating whether a change to a system data item is an experimental change or not; i.e., use of an experimental (or non-experimental) application implies that a change to a system data item as part of an experiment (or not as part of an experiment). As a particular example, the FactoryApp application is only available within a production facility/factory of an manufacturer of computing device 100, the ExperiApp application is only available for use by authorized maintenance personnel to experiment on computing device 100 to test and improve its performance by making system data changes, and the UserApp application is generally available for use in making a limited set of system data changes. Then, for this particular example, the use of "FactoryApp" as an application making a system data entry change logged in system log 350 can be treated during recovery procedure 102 as a trusted data change, while use of any other application can be treated during recovery procedure 102 as an untrusted data change. Also, the use of "ExperiApp" as an application making a system data entry change logged in system log 350 can be treated during recovery procedure 102 as an experimental change, while use of any other application can be treated during recovery procedure 102 as a non-experimental data change.

In even other examples, the changes logged in the system log that were made by untrusted entities can be reapplied at some later time; e.g., after computing device 100 exits recovery procedure 102. As corrective action 320 does not delete the changes made by untrusted entities from the system log, corrective action 320 would not change reapplication of the changes made by untrusted entities at the later time.

Corrective action 320 of resetting system values changed by untrusted entities can include: (1) initializing setting system data items to values stored in a default set of system data items; e.g., a set of factory-recommended values for the system data items; (2) determining if any changes have been made to the system data items, and (3) if changes have been made to the system data items, applying only changes that have been made by trusted entities to the system data items.

Suppose that in the example of system log 350, the default/factory value for each of "Setting1" and "Setting2" is 0 and the default value for "Setting14" is "A1". In this example, corrective action 320 would: reset respective system data items "Setting1" and "Setting14" to their respective default/factory values of 0 and A1, as each of the first and third entries of system log 350 indicates the respective changes were made by an "Untrusted" entity, while the change of "Setting2" indicated in system log 350 to the value of 3 would be preserved, since the change to "Setting2" was made by a "Trusted" entity.

Corrective action 318 of clearing the system log of untrusted changes can involve deleting/clearing all changes from a system log that were made by one or more untrusted entities. In the example system log 350 shown in FIG. 3A, corrective action 318 would involve deleting a logged change to "Setting1" from system log 350 as a change made by an untrusted entity and preserving a logged change to "Setting2" made by a trusted entity in system log 350.

In some examples, corrective action 318 can also involve resetting system data values, such as discussed above for corrective action 320. For example, corrective action 318 can involve (1) deleting/clearing all changes from the system log that were made by one or more untrusted entities (2) initializing setting system data items to values stored in a default set of system data items; (2) determining if any changes remain in the system log; and (4) if any changes do remain in the system log, applying the changes in the system log, as any changes remaining in the system log have been made by trusted entities (since all changes by untrusted entities have been deleted at step (1) of corrective action 318). In examples where changes logged in the system log are reapplied at some later time, corrective action 318 would change reapplication, as the changes made by untrusted entities would have been deleted by corrective action 318.

Corrective action 316 of resetting system values changed by both untrusted and trusted entities can involve initializing setting system data items to values stored in the default set of system data items, thereby ignoring all changes logged in the system log.

Corrective action 314 of clearing the system log of all changes can involve removing all changes logged in the system log. Corrective action 314 differs from corrective action 318 of clearing the system log of untrusted changes, as a change made by a trusted entity would be preserved in the system log by corrective action 318, but the change made by the trusted entity would be deleted/cleared from the system log by corrective action 314.

Corrective action 312 of clearing all persistent data can involve removing all user data from persistent storage, such as, but not limited to, flash and/or disk storage. User data can include, but is not limited to, photos, videos, contacts, calendar entries, e-mails, text messages, user-installed applications, and data cached by/on behalf of a user. In some cases, corrective action 312 is performed only after receiving user input authorizing clearing of user data from persistent storage, such as discussed below at least in the context of FIG. 4.

FIG. 3B illustrates software corrective actions 310 and hardware corrective actions 330, along with system log 350, in accordance with at least some example embodiments. Software corrective actions 310 and system log 350 are discussed above in detail with respect to FIG. 3A.

FIG. 3B shows that hardware corrective actions 330 can include, but are not limited to (in decreasing order of severity/value of the Level variable): corrective action 332 of a hard device reset, corrective action 334 of a soft device reset, corrective action 336 of a reset of one or more components, corrective action 338 of clearing one or more regions of non-persistent memory, and corrective action 340 of clearing one or more hardware registers. In some examples, software corrective actions 310 and/or hardware corrective actions 330 can further include a "No Action" corrective action, where the hardware (or software) corrective action involves taking no further action/doing nothing.

Corrective action 340 of clearing hardware register(s) can involve setting one or more hardware registers to values representing "cleared" or default values; e.g., setting the hardware register(s) to zero values. Corrective action 338 of clearing region(s) of non-persistent memory can involve setting one or more locations or other regions of non-persistent memory (e.g., random accessible memory (RAM)) to cleared values. Corrective action 336 of resetting component(s) can involve reloading, restarting, and/or otherwise initializing the component(s) being reset. Examples of corrective action 336 include, but are not limited to, resetting a camera, a screen, a communications transceiver or other communications-related component, a speaker, and a microphone. Corrective action 334 of a soft device reset can involve restarting/initializing computing device 100 without interrupting battery and/or other power to computing device 100. Corrective action 332 of a hard device reset can involve restarting/initializing computing device 100 with a "power cycle" or turning battery and/or other power of computing device 100 off and then on. In some examples, each hardware corrective action 330 can invoke some or all of hardware corrective actions lower in escalation level than the corrective action; e.g., corrective action 336 of resetting component(s) can also involve corrective action 338 of clearing region(s) of non-persistent memory and/or corrective action 340 of clearing hardware register(s).

In some examples, some or all of software corrective actions 310 of FIGS. 3A and 3B and hardware corrective actions 330 of FIG. 3B can be associated with a specific value of the escalation level variable Level. For example, software corrective action 320 and/or hardware corrective action 340 can be associated with a smallest value of the Level variable; e.g., Level=1. As another example, software corrective action 312 and/or hardware corrective action 332 can be associated with a largest value of the Level variable.

FIG. 3A indicates that escalating software corrective actions 310 can be taken as part of a recovery procedure without taking any corresponding escalating hardware corrective actions 330. FIG. 3B indicates that both escalating software corrective actions 310 and escalating hardware corrective actions 330 can be taken as part of a recovery procedure. In other examples, escalating hardware corrective actions can be taken without any corresponding escalating software corrective actions; e.g., one or more of hardware corrective actions 330 can be taken during a recovery procedure without taking any of software corrective actions 310.

Table 1 below shows an example of escalating corrective actions using eight different values of the Level variable. In this example, corrective actions at Level=N (N>1) are only taken by computing device 100 after corrective actions taken when Level=1 . . . N−1 have already been taken by computing device 100.

TABLE 1

| Level Value | Hardware Corrective Action | Software/Data Corrective Action |
|---|---|---|
| 1 | No action | Corrective action 320 of resetting system values changed by untrusted entities |
| 2 | No action | Corrective action 318 of clearing system log of changes made by untrusted entities |
| 3 | Corrective action 340 of clearing hardware register(s) | Corrective action 316 of resetting system values changed by all entities to default values. |
| 4 | Corrective action 338 of clearing region(s) of non-persistent memory | Corrective action 314 of clearing system change log of all changes |
| 5 | Corrective action 336 of resetting hardware component(s) | No action |
| 6 | Corrective action 334 of a soft device reset | No action |
| 7 | Corrective action 332 of a hard device reset | No action |
| 8 | Corrective action 332 of a hard device reset | Corrective action 312 of clearing persistent data |

Many other examples of escalating corrective actions are possible as well.

Figure 4:
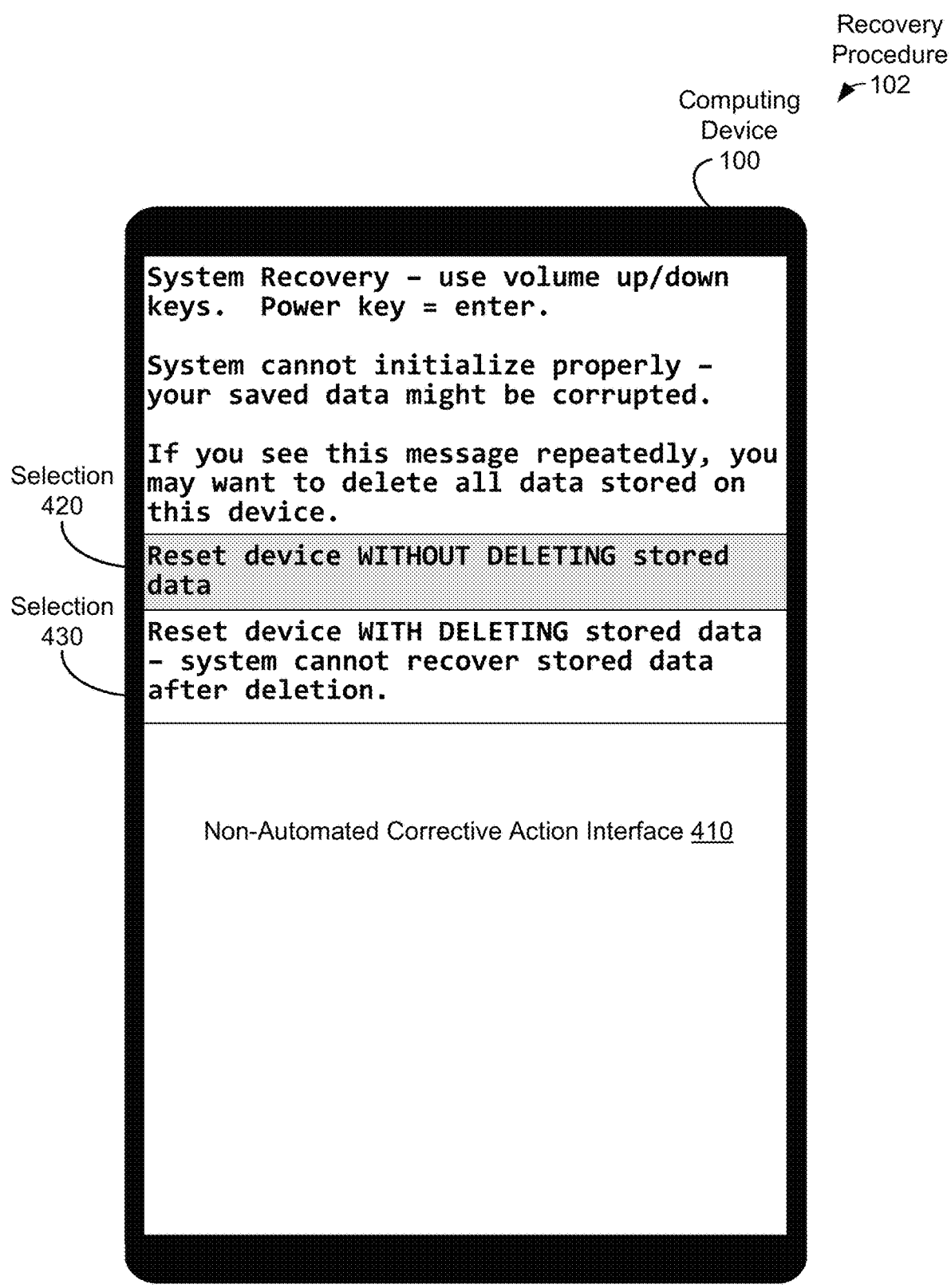
FIG. 4 depicts a corrective action interface for the computing device of FIG. 1, in accordance with at least some example embodiments.

FIG. 4 depicts a non-automated corrective action interface 410 for computing device 100, in accordance with at least some example embodiments. Non-automated corrective action interface 410 can provide a user with information about corrective actions that can be taken based on user input and/or one or more prompts for such user input; e.g., user input authorizing initializing computing device 100 and/or clearing of user data from persistent storage of computing device 100. For example, non-automated corrective action interface 410 can display information about corrective action 332 of clearing persistent user data, where the information includes information that computing device 100 is in a "System Recovery" state where the "[s]ystem cannot initialize properly—your saved data might be corrupted". Further, the user is informed by non-automated corrective action interface 410 that "[if] you see this message repeatedly, you may want to delete all data stored on this device".

Non-automated corrective action interface 410 can prompt a user to provide one or more selections, such as selections 420 and 430, thereby providing user input about corrective actions. To make selections with non-automated corrective action interface 410, a user can "use volume up/down keys" to choose between selections 420 and 430 and can use a "[p]ower key" as an "enter" button to make a selection; i.e., make a choice between selection 420 and selection 430. FIG. 4 shows that selection 420, if chosen, involves "[r]eset[ting] device WITHOUT DELETING stored data"; e.g., choosing selection 420 leads to taking hardware corrective action 332 but not taking software corrective action 312. FIG. 4 also shows that selection 430, if chosen, involves "[r]eset[ting] device WITH DELETING stored data—system cannot recover stored data after deletion"; e.g., choosing selection 430 leads to taking both hardware corrective action 332 and software corrective action 312. FIG. 4 also shows that currently selection 420 is chosen, as selection 420 is shown with a greyed background to indicate a user has currently chosen selection 420, as opposed to selection 430, which is shown with a white background, which is the same color background used for non-automated corrective action interface 410.

At block 150 of FIG. 1, computing device 100 can take the corrective actions selected at block 140.

At block 160, computing device 100 can increment the value of the Level variable by one.

At block 170, computing device 100 can determine whether the value of the Level value is greater than a variable LevelMax set to the maximum value of Level associated with corrective actions. For the example shown in Table 1 above, LevelMax would be set equal to eight, as the highest level value in Table 1 is 8, which corresponds to the maximum value of Level associated with one or more corrective actions. In some examples, the LevelMax variable is initialized at block 110. If the value of the Level variable is less than or equal to the value of the LevelMax variable, then computing device 100 can proceed to block 120. Otherwise, the value of the Level variable is greater than the value of the LevelMax variable, and computing device 100 can proceed to block 180.

At block 180, computing device 100 can take non-automated corrective actions as directed; e.g., computing device 100 can use non-automated corrective action interface 410 or another user interface configured for obtaining (user) information about non-automated corrective actions. Once non-automated corrective action interface 410 or another user interface is used to obtain (user) information about which (if any) non-automated corrective actions are to be taken. After obtaining the information about which (if any) non-automated corrective actions are to be taken, computing device 100 can take the non-automated corrective actions as indicated by the obtained (user) information. After taking the non-automated corrective actions, computing device 100 can exit and thereby end recovery procedure 102.

Example Data Network

Figure 5:
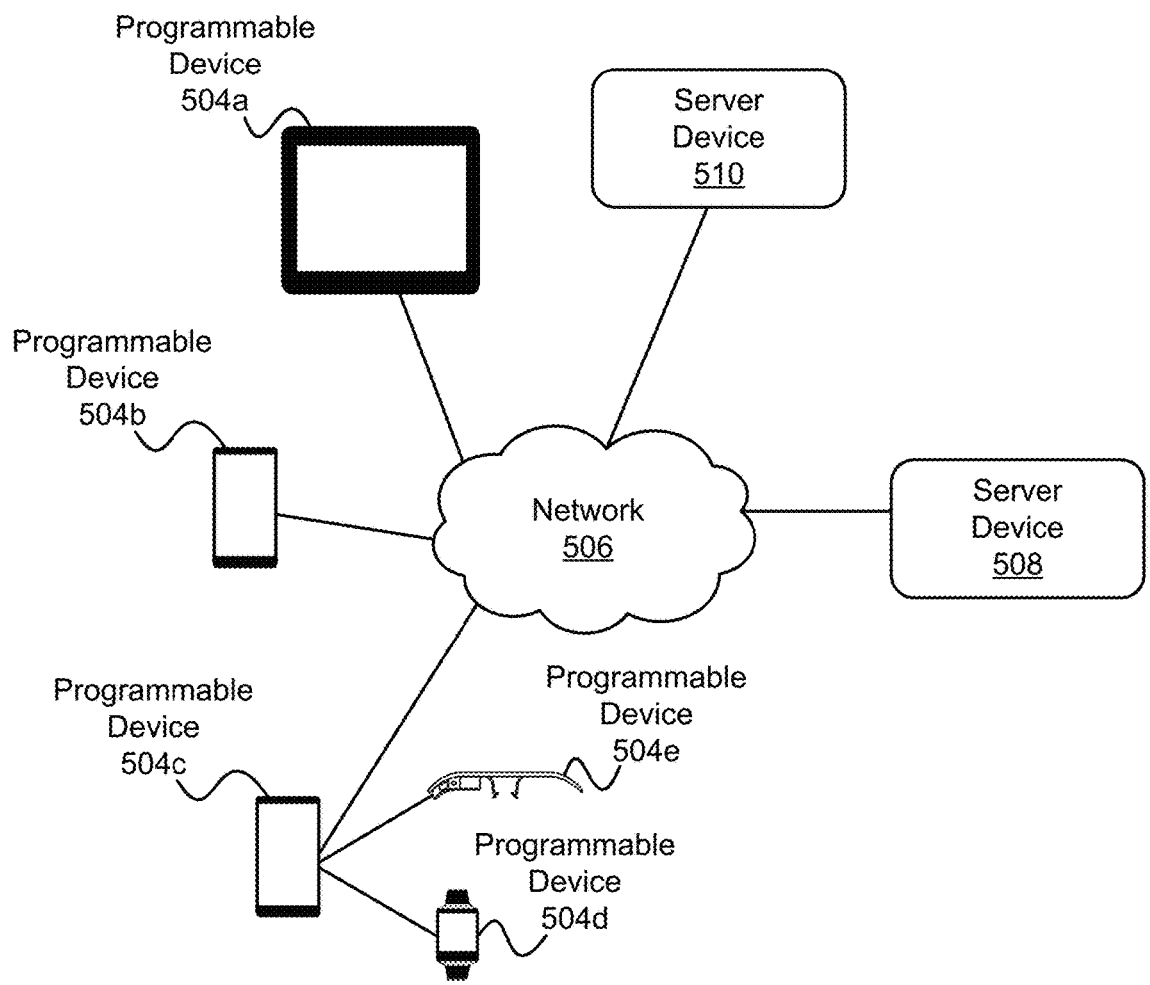
FIG. 5 depicts a distributed computing architecture, in accordance with at least some example embodiments.

FIG. 5 depicts a distributed computing architecture 500 with server devices 508, 510 configured to communicate, via network 506, with programmable devices 504a, 504b, 504c, 504d, 504e, in accordance with example embodiments. Network 506 may correspond to a LAN, a wide area network (WAN), a WWAN, a corporate intranet, the public Internet, or any other type of network configured to provide a communications path between networked computing devices. Network 506 may also correspond to a combination of one or more LANs, WANs, WWANs, corporate intranets, and/or the public Internet.

Although FIG. 5 only shows five programmable devices, distributed application architectures may serve tens, hundreds, or thousands of programmable devices. Moreover, programmable devices 504a, 504b, 504c, 504d, 504e (or any additional programmable devices) may be any sort of computing device, such as an ordinary laptop computer, desktop computer, wearable computing device, mobile computing device, head-mountable device (HMD), network terminal, wireless communication device (e.g., a smart phone and/or cell phone), and so on. In some embodiments, such as indicated with programmable devices 504a, 504b, 504c, programmable devices can be directly connected to network 506. In other embodiments, such as indicated with programmable devices 504d and 504e, programmable devices can be indirectly connected to network 506 via an associated computing device, such as programmable device 504c. In this example, programmable device 504c can act as an associated computing device to pass electronic communications between programmable devices 504d and 504e and network 506. In still other embodiments not shown in FIG. 5, a programmable device can be both directly and indirectly connected to network 506.

Server devices 508, 510 can be configured to perform one or more services, as requested by programmable devices 504a-504e. For example, server device 508 and/or 510 can provide content to programmable devices 504a-504e. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 508 and/or 510 can provide programmable devices 504a-504e with access to software for database, search, computation, graphical, audio, video, World Wide Web/Internet utilization, and/or other functions. Many other examples of server devices are possible as well.

Computing Device Architecture

Figure 6:
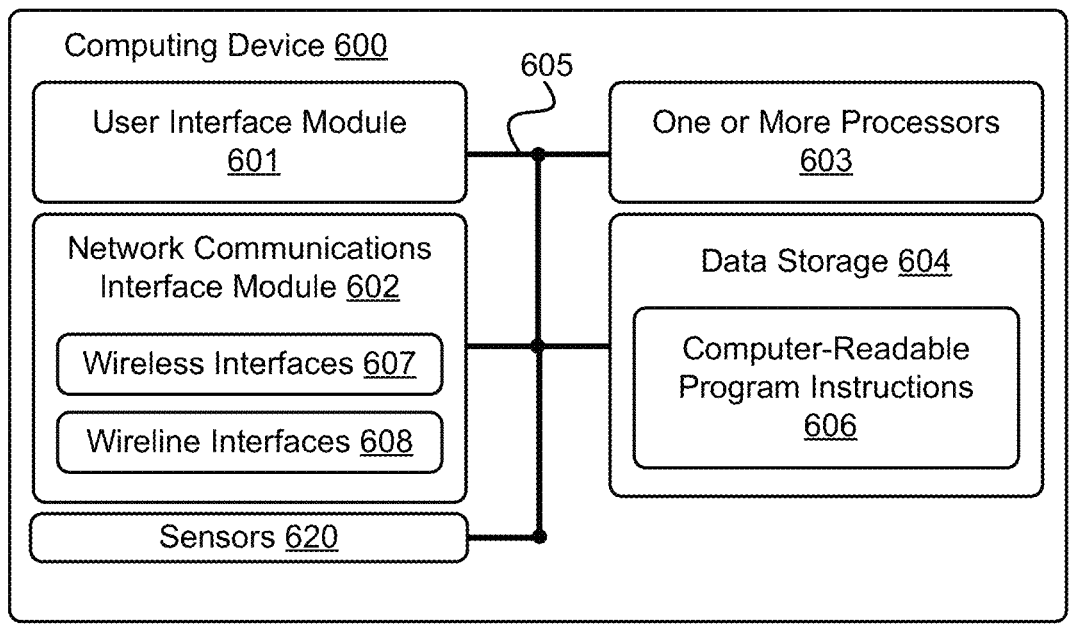
FIG. 6 is a functional block diagram of a computing device, in accordance with at least some example embodiments.

FIG. 6 is a functional block diagram of a computing device 600, in accordance with at least some example embodiments. In particular, computing device 600 shown in FIG. 6 can be configured to perform at least one function of/related to: herein-described software, recovery techniques, system data/system data items, computing device 100, recovery procedure 102, techniques 210, 220, 230, 240, 250, 260, corrective actions 310, 312, 314, 316, 318, 320, 330, 332, 334, 336, 338, 340, system log 350, non-automated corrective action interface 410, programmable devices 504a, 504b, 504c, 504d, 504e, network 506, server devices 508, 510, and method 700.

Computing device 600 may include a user interface module 601, a network-communication interface module 602, one or more processors 603, data storage 604, and one or more sensors 620, all of which may be linked together via a system bus, network, or other connection mechanism 605.

User interface module 601 can be operable to send data to and/or receive data from external user input/output devices. For example, user interface module 601 can be configured to send and/or receive data to and/or from user input devices such as a keyboard, a keypad, a touch screen, a computer mouse, a track ball, a joystick, a camera, a voice recognition module, and/or other similar devices. User interface module 601 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 601 can also be configured to generate audible output(s), such as a speaker, speaker jack, audio output port, audio output device, earphones, and/or other similar devices. User interface module 601 can further be configured with one or more haptic devices that can generate haptic output(s), such as vibrations and/or other outputs detectable by touch and/or physical contact with computing device 600. In some embodiments, user interface module 601 can be used to provide a graphical user interface for utilizing computing device 600 and/or for providing non-automated corrective action interface 410.

Network-communications interface module 602 can include one or more wireless interfaces 607 and/or one or more wireline interfaces 608 that are configurable to communicate via a network. Wireless interfaces 607 can include one or more wireless transmitters, receivers, and/or transceivers, such as a Bluetooth™ transceiver, a Zigbee® transceiver, a Wi-Fi™ transceiver, a WiMAX™ transceiver, and/or other similar type of wireless transceiver configurable to communicate via a wireless network, such as but not limited to, a wireless LAN and/or a WWAN. Wireline interfaces 608 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 602 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

One or more processors 603 can include one or more general purpose processors, and/or one or more special purpose processors (e.g., digital signal processors, graphics processing units, application specific integrated circuits, etc.). One or more processors 603 can be configured to execute computer-readable program instructions 606 that are contained in data storage 604 and/or other instructions as described herein.

Data storage 604 can include one or more computer-readable storage media that can be read and/or accessed by at least one of one or more processors 603. The one or more computer-readable storage media can include volatile and/or non-volatile storage components, such as optical, magnetic, organic or other memory or disc storage, which can be integrated in whole or in part with at least one of one or more processors 603. In some embodiments, data storage 604 can be implemented using a single physical device (e.g., one optical, magnetic, organic or other memory or disc storage unit), while in other embodiments, data storage 604 can be implemented using two or more physical devices.

Data storage 604 can include computer-readable program instructions 606 and perhaps additional data. In some embodiments, data storage 604 can additionally include storage required to perform at least part of the herein-described methods, procedures, scenarios, and techniques and/or at least part of the functionality of the herein-described devices and networks.

In some embodiments, computing device 600 can include one or more sensors 620. Sensor(s) 620 can be configured to measure conditions in an environment of computing device 600 and provide data about that environment. For example, sensor(s) 620 can include one or more of: (i) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and a laser tracker, where the identification sensor(s) can be configured to read identifiers, such as RFID tags, barcodes, QR codes, and/or other devices and/or object configured to be read and provide at least identifying information; (ii) a location sensor to measure locations and/or movements of computing device 600, such as, but not limited to, a gyroscope, an accelerometer, a Doppler sensor, a Global Positioning System (GPS) device, a sonar sensor, a radar device, a laser-displacement sensor, and a compass; (iii) an environmental sensor to obtain data indicative of an environment of computing device 600, such as, but not limited to, an infrared sensor, an optical sensor, a light sensor, a camera, a biosensor, a capacitive sensor, a touch sensor, a temperature sensor, a wireless sensor, a radio sensor, a movement sensor, a microphone, a sound sensor, an ultrasound sensor, and/or a smoke sensor; and (iv) a force sensor to measure one or more forces (e.g., inertial forces and/or G-forces) acting about computing device 600, such as, but not limited to one or more sensors that measure: forces in one or more dimensions, torque, ground force, friction, and/or a zero moment point (ZMP) sensor that identifies ZMPs and/or locations of the ZMPs. Many other examples of sensor(s) 620 are possible as well.

Example Methods of Operation

Figure 7:
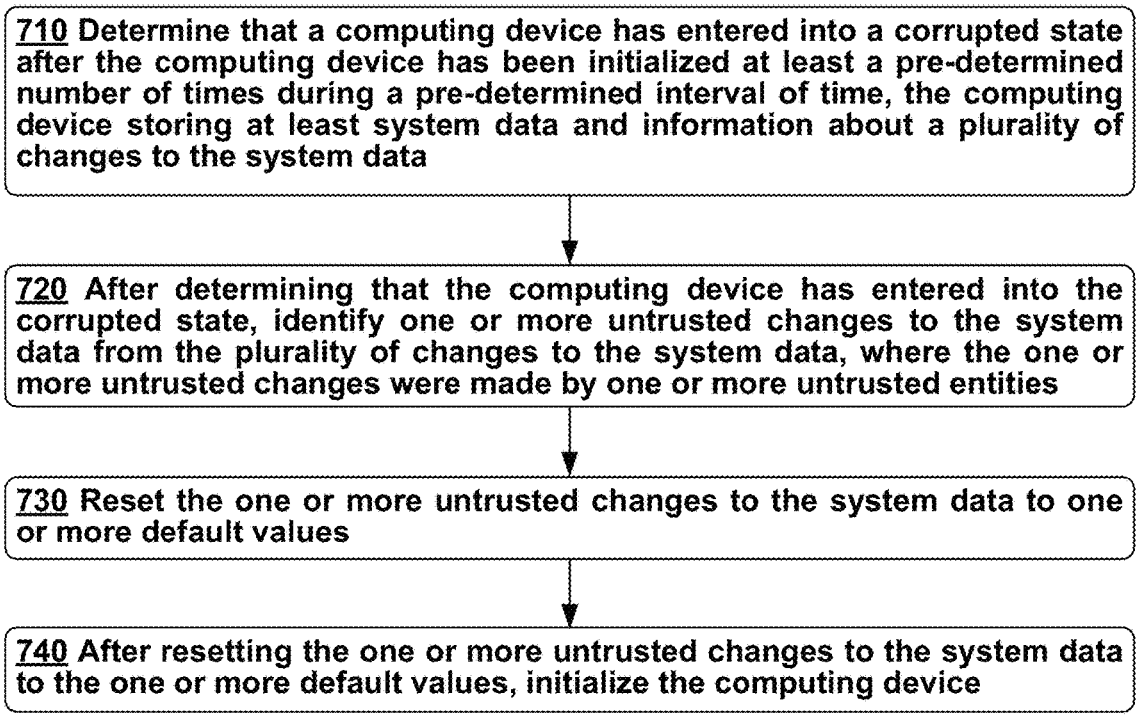
FIG. 7 is a flowchart of a method, in accordance with at least some example embodiments.

FIG. 7 is a flowchart of method 700, in accordance with at least some example embodiments. Method 700 can be executed by a computing device, such as computing device 600. Method 700 can begin at block 710, where the computing device can determine that the computing device has entered into a corrupted state after the computing device has been initialized at least a pre-determined number of times during a pre-determined interval of time, where the computing device stores at least system data and information about a plurality of changes to the system data, such as discussed above in the context of at least FIGS. 1-3B.

In some embodiments, the changes to the system data include an experimental change to the system data to an experimental value, and the information about the plurality of changes to the system data includes an indication of the experimental change and an indication of an application of the computing device making the experimental change, such as discussed above in the context of at least FIGS. 1, 3A, and 3B. In particular of these embodiments, the one or more untrusted changes to the system data include the experimental change, such as discussed above in the context of at least FIGS. 1, 3A, and 3B.

In other embodiments, determining that the computing device has entered into the corrupted state includes determining that the computing device has restarted one or more applications at least a second pre-determined number of times during a second pre-determined interval of time, such as discussed above in the context of at least FIGS. 1 and 2. In particular of these embodiments, the second pre-determined interval of time is shorter than the pre-determined interval of time, such as discussed above in the context of at least FIGS. 1 and 2.

In even other embodiments, determining that the computing device has entered into the corrupted state includes determining that the computing device has lost at least a pre-determined amount of battery power during a pre-determined interval of time, such as discussed above in the context of at least FIGS. 1 and 2.

At block 720, after determining that the computing device has entered into the corrupted state, the computing device can identify one or more untrusted changes to the system data from the plurality of changes to the system data, where the one or more untrusted changes were made by one or more untrusted entities, such as discussed above in the context of at least FIGS. 1 and 3.

In some embodiments, the information about the plurality of changes to the system data includes one or more log entries regarding the plurality of changes to the system data, where each of the one or more log entries records a change to the system data and an application associated with the change to the system data, such as discussed above in the context of at least FIGS. 1, 3A, and 3B. In particular of these embodiments, identifying one or more changes to the system data made by one or more untrusted entities from the plurality of changes to the system data includes determining whether a particular change of the plurality of changes to the system data is associated with an untrusted entity based on a log entry for a particular change to the system data, such as discussed above in the context of at least FIGS. 1, 3A, and 3B. In other particular of these embodiments, each of the one or more log entries further records an indication whether a trusted entity made the change to the system data such as discussed above in the context of at least FIGS. 1, 3A, and 3B.

At block 730, the computing device can reset the one or more untrusted changes to the system data to one or more default values, such as discussed above in the context of at least FIGS. 1, 3A, and 3B.

At block 740, the computing device can be initialized after resetting the one or more untrusted changes to the system data to the one or more default values, such as discussed above in the context of at least FIGS. 1, 3A, and 3B.

In some embodiments, method 700 further includes: after initializing the computing device, determining whether the computing device remains in the corrupted state; and after determining that the computing device does not remain in the corrupted state, exiting a recovery procedure of the computing device, such as discussed above in the context of at least FIG. 1.

In other embodiments, the plurality of changes includes the one or more untrusted changes to the system data and one or more trusted changes made by one or more trusted entities; then, method 700 can further include: after initializing the computing device, determining whether the computing device remains in the corrupted state; and after determining that the computing device does remain in the corrupted state, deleting the one or more untrusted changes to the system data from the stored plurality of changes to the system data; resetting the one or more trusted changes to the system data to one or more default values; and after resetting the one or more trusted changes to the system data to the one or more default values, performing a second initialization of the computing device, such as discussed above in the context of at least FIGS. 1, 3A, and 3B.

In still other embodiments, method 700 further includes: after performing the second initialization the computing device, determining whether the computing device remains in the corrupted state; after determining that the computing device does remain in the corrupted state, deleting the one or more trusted changes from the stored plurality of changes to the system data; resetting the system data to one or more default values; and after resetting the system data to the one or more default values, performing a third initialization of the computing device, such as discussed above in the context of at least FIGS. 1, 3A, and 3B. In some of these embodiments, method 700 further includes: after performing the third initialization of the computing device, determining whether the computing device remains in the corrupted state; after determining that the computing device does remain in the corrupted state, generating a prompt requesting input regarding removal of persistent data of the computing device; after receiving input to remove the persistent data, removing the persistent data; and performing a hardware reset of the computing device, such as discussed above in the context of at least FIGS. 1 and 4.

In even other embodiments, method 700 further includes: selecting one or more data-oriented corrective actions to remove the computing device from the corrupted state, such as discussed above in the context of at least FIGS. 1, 3A, and 3B. In some of these embodiments, the one or more data-oriented corrective actions include one or more of: taking no action, an action of setting system data to default values, an action of removing system data changes associated with one or more untrusted entities, an action of removing system data changes associated with one or more trusted entities, an action of clearing one or more caches of the computing device, an action of clearing one or more data structures associated with wireless communications of the computing device, and an action of removing data from persistent storage of the computing device, such as discussed above in the context of at least FIGS. 1, 3A, and 3B.

In yet other embodiments, method 700 further includes: selecting one or more hardware-oriented corrective actions to remove the computing device from the corrupted state, such as discussed above in the context of at least FIGS. 1, 3A, and 3B. In some of these embodiments, the one or more hardware-oriented corrective actions include one or more of: taking no action, an action of clearing one or more memory regions of the computing device, an action of resetting one or more components of the computing device, an action of restarting the computing device, and an action of performing a hardware reset, such as discussed above in the context of at least FIGS. 1, 3A, and 3B.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compactdisc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for provided for explanatory purposes and are not intended to be limiting, with the true scope being indicated by the following claims.

What is claimed is:

1. A method, comprising:
   determining that a computing device has entered into a corrupted state after the computing device has been initialized at least a pre-determined number of times during a pre-determined interval of time, the computing device storing at least system data and information about a plurality of changes to the system data;
   after determining that the computing device has entered into the corrupted state, identifying one or more untrusted changes to the system data from the plurality of changes to the system data, wherein the one or more untrusted changes were made by one or more untrusted entities;
   resetting the one or more untrusted changes to the system data to one or more default values; and
   after resetting the one or more untrusted changes to the system data to the one or more default values, initializing the computing device.

2. The method of claim 1, wherein the method further comprises:
   after initializing the computing device, determining whether the computing device remains in the corrupted state; and
   after determining that the computing device does not remain in the corrupted state, exiting a recovery procedure of the computing device.

3. The method of claim 1, wherein the plurality of changes comprise the one or more untrusted changes to the system data and one or more trusted changes made by one or more trusted entities, and wherein the method further comprises:
   after initializing the computing device, determining whether the computing device remains in the corrupted state;
   after determining that the computing device does remain in the corrupted state, deleting the one or more untrusted changes to the system data from the stored plurality of changes to the system data;
   resetting the one or more trusted changes to the system data to one or more default values; and
   after resetting the one or more trusted changes to the system data to the one or more default values, performing a second initialization of the computing device.

4. The method of claim 3, wherein the method further comprises:
   after performing the second initialization the computing device, determining whether the computing device remains in the corrupted state;
   after determining that the computing device does remain in the corrupted state, deleting the one or more trusted changes from the stored plurality of changes to the system data;
   resetting the system data to one or more default values; and
   after resetting the system data to the one or more default values, performing a third initialization of the computing device.

5. The method of claim 4, wherein the method further comprises:
   after performing the third initialization of the computing device, determining whether the computing device remains in the corrupted state;
   after determining that the computing device does remain in the corrupted state, generating a prompt requesting input regarding removal of persistent data of the computing device;
   after receiving input to remove the persistent data, removing the persistent data; and
   performing a hardware reset of the computing device.

6. The method of claim 1, wherein the information about the plurality of changes to the system data comprises one or more log entries regarding the plurality of changes to the system data, wherein each of the one or more log entries records: a change to the system data and an application associated with the change to the system data.

7. The method of claim 6, wherein identifying one or more changes to the system data made by one or more untrusted entities from the plurality of changes to the system data comprises determining whether a particular change of the plurality of changes to the system data is associated with an untrusted entity based on a log entry for a particular change to the system data.

8. The method of claim 6, wherein each of the one or more log entries further records an indication whether a trusted entity made the change to the system data.

9. The method of claim 1, wherein the plurality of changes to the system data comprise an experimental change to the system data to an experimental value, and wherein the information about the plurality of changes to the system data comprises an indication of the experimental change and an indication of an application of the computing device making the experimental change.

10. The method of claim 9, wherein the one or more untrusted changes to the system data comprise the experimental change.

11. The method of claim 1, further comprising:
    selecting one or more data-oriented corrective actions to remove the computing device from the corrupted state.

12. The method of claim 11, wherein the one or more data-oriented corrective actions include one or more of: taking no action, an action of setting system data to default values, an action of removing system data changes associated with one or more untrusted entities, an action of removing system data changes associated with one or more trusted entities, an action of clearing one or more caches of the computing device, an action of clearing one or more data structures associated with wireless communications of the computing device, and an action of removing data from persistent storage of the computing device.

13. The method of claim 1, further comprising:
    selecting one or more hardware-oriented corrective actions to remove the computing device from the corrupted state.

14. The method of claim 13, wherein the one or more hardware-oriented corrective actions include one or more of:

taking no action, an action of clearing one or more memory regions of the computing device, an action of resetting one or more components of the computing device, an action of restarting the computing device, and an action of performing a hardware reset.

15. The method of claim 1, wherein determining that the computing device has entered into the corrupted state comprises determining that the computing device has restarted one or more applications at least a second pre-determined number of times during a second pre-determined interval of time.

16. The method of claim 15, wherein the second pre-determined interval of time is shorter than the pre-determined interval of time.

17. The method of claim 1, wherein determining that the computing device has entered into the corrupted state comprises determining that the computing device has lost at least a pre-determined amount of battery power during a pre-determined interval of time.

18. A computing device, comprising:
one or more processors; and
data storage storing at least system data, information about a plurality of changes to the system data, and computer-executable instructions, where the computer-executable instructions, when executed by the one or more processors, cause the computing device to perform functions comprising:
determining whether the computing device has entered into a corrupted state after the computing device has been initialized at least a pre-determined number of times during a pre-determined interval of time;
after determining that the computing device has entered into the corrupted state, identifying one or more untrusted changes to the system data from the plurality of changes to the system data, wherein the one or more untrusted changes were made by one or more untrusted entities;
resetting the one or more untrusted changes to the system data to one or more default values; and
after resetting the one or more untrusted changes to the system data to the one or more default values, initializing the computing device.

19. The computing device of claim 18, wherein the plurality of changes comprise the one or more untrusted changes to the system data and one or more trusted changes made by one or more trusted entities, and wherein the functions further comprise:
after initializing the computing device, determining whether the computing device remains in the corrupted state;
after determining that the computing device does remain in the corrupted state, deleting the one or more untrusted changes to the system data from the stored plurality of changes to the system data;
resetting the one or more trusted changes to the system data to one or more default values; and
after resetting the one or more trusted changes to the system data to the one or more default values, performing a second initialization of the computing device.

20. A non-transitory computer-readable medium having stored thereon computer-executable instructions that, when executed by one or more processors of a computing device, cause the computing device to perform functions comprising:
determining that the computing device has entered into a corrupted state after the computing device has been initialized at least a pre-determined number of times during a pre-determined interval of time, the computing device storing at least system data and information about a plurality of changes to the system data;
after determining that the computing device has entered into the corrupted state, identifying one or more untrusted changes to the system data from the plurality of changes to the system data, wherein the one or more untrusted changes were made by one or more untrusted entities;
resetting the one or more untrusted changes to the system data to one or more default values; and
after resetting the one or more untrusted changes to the system data to the one or more default values, initializing the computing device.

* * * * *